Oct. 18, 1938.                W. H. VAUGHAN                 2,133,774
                         HIGH PRESSURE GAS PROCESS
                           Filed Aug. 20, 1937
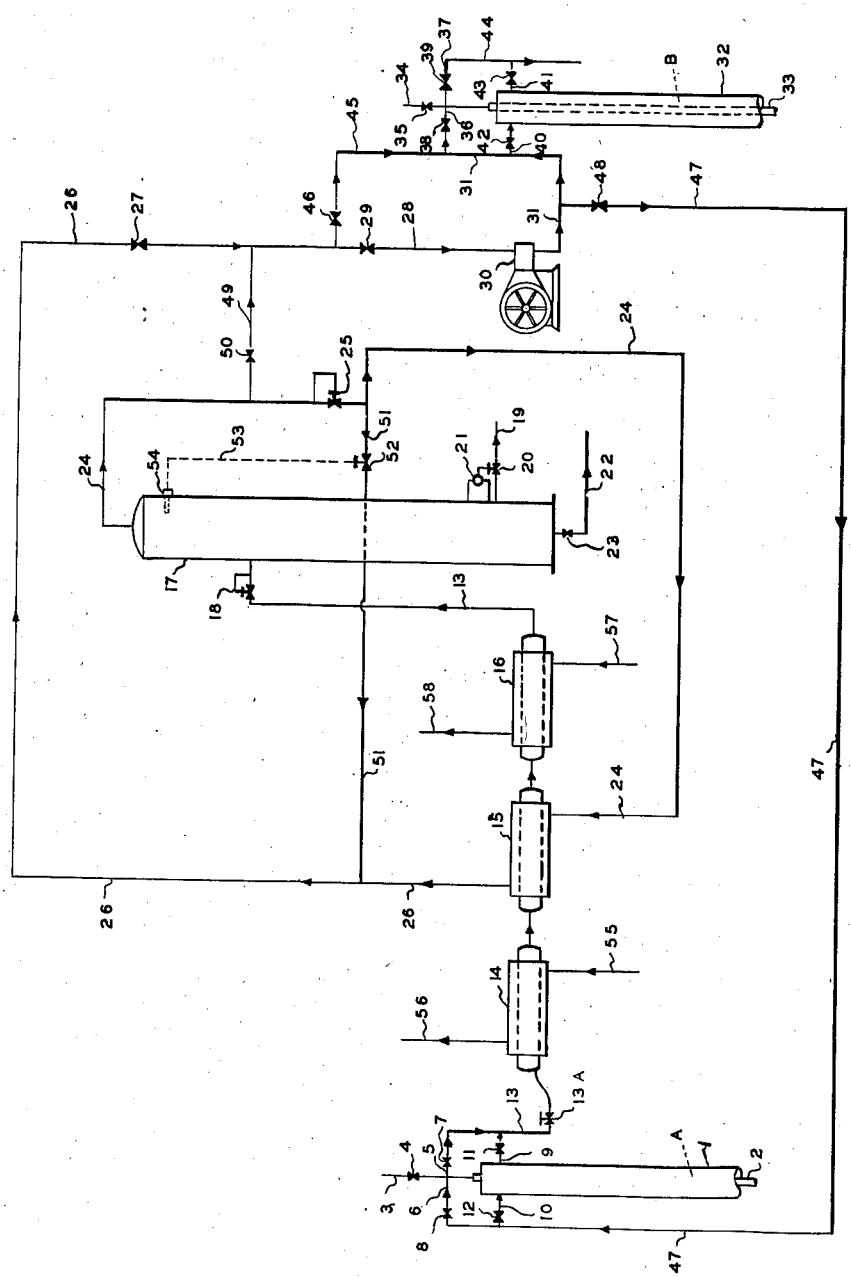
WM. H. VAUGHAN
INVENTOR
BY
ATTORNEY Patented Oct. 18, 1938

2,133,774

UNITED STATES PATENT OFFICE 2,133,774

HIGH PRESSURE GAS PROCESS

William H. Vaughan, Rodessa, La., assignor to Tide Water Associated Oil Company, Tulsa, Okla., a corporation of Delaware, and Seaboard Oil Company of Delaware, Dallas, Tex., a corporation of Delaware Application August 20, 1937, Serial No. 160,192

14 Claims. (Cl. 62—175.5)

This invention relates to a process of recovering desirable constituents from gases and particularly to a process of recovering gasoline constituents from natural gas.

An object of this invention is to recover desirable constituents from gas while said gas is at relatively high pressure.

Another object of this invention is to recover desirable constituents from gas initially at relatively high pressures without dissipating more than a minimum amount of the pressure energy initially present in the gas.

A further object is to recover desirable constituents from a gas by treatment thereof at pressures above 700 pounds per square inch.

This invention further contemplates the treatment of gas initially available from gas or oil wells at pressures substantially above 700 pounds per square inch, to recover therefrom gasoline hydrocarbons, while maintaining the gas at high pressures of the order of the initial pressure, in order that the residue gas from the process may be available at pressures sufficiently high to permit its direct use for repressuring of high pressure oil or gas formations or for other purposes for which high pressure gases are particularly desirable, to thereby avoid the excess cost of equipment and power now required for the recompression of gases to be used under high pressure conditions.

Heretofore, because of the relatively limited information available with regard to the behavior of gases and liquefiable constituents contained therein when under relatively high pressures, the recovery of such liquefiable constituents was accomplished in the conventional manner by first reducing the pressure of the gas to a relatively low pressure and then processing the gas for the recovery of desired constituents by conventional methods such as the conventional absorption system.

Such conventional methods necessitated the dissipation of a relatively large proportion of the initial pressure energy in the gas, which energy would otherwise be useful for various purposes and particularly where it is desired to return the gas to an oil or other producing formation for repressuring such formation. Furthermore, in reducing the pressure of gas from the comparatively high pressure at which it is frequently available at oil or gas wells to the comparatively low pressure necessitated when processing the gas by conventional methods, great increases in volume of the gas result, requiring equipment of proportionately increased size for the handling thereof, For example, with a gas available at 1400 pounds per square inch at the well, when the pressure is reduced to 400 pounds for absorption and even this pressure is comparatively high for present day absorption processes, the gas will expand to more than three and one-half times its initial volume. On the other hand, by the process of this invention, a gas at 1400 pounds pressure may be processed at that pressure, for the recovery of desirable constituents therefrom, and the pressure thereafter reduced to 1000 pounds, and thus expand to about 40 percent of the volume occupied in the first example.

Another advantage obtained in processing gas at the high pressures contemplated by this invention, is that at such high pressures, gases exhibit heat exchange and flow characteristics approaching those of liquids, and the efficiency of heat exchanger and other equipment, through which high pressure gases are transmitted, is correspondingly increased.

Another factor which becomes of great importance when dealing with gases under high pressures is that condition now generally termed "retrograde condensation". This term may be explained as follows: When liquid such as a hydrocarbon liquid of mixed composition is in contact with vapors thereof and uncondensible gases such as methane and is subjected to increasingly high pressures, above 700 pounds per square inch, the liquid will go into solution in increasing amounts in the vapor, as the pressure increases above this lower limit, though there is no change in temperature and even though the temperature is below the condensation temperatures of the various components of the liquid. When the pressure of such gases containing the dissolved components is reduced through a limited range above 700 pounds per square inch, condensation of liquid occurs, even though the temperature remains constant. This condensation of liquid by reduction in pressure is termed "retrograde condensation", and takes place in a particular pressure range for each particular composition of liquid, at each particular temperature. The range of pressure within which retrograde condensation occurs is the retrograde condensation range, and below this range no additional liquid will condense without reduction in temperature, but instead, as the pressure is further reduced, the liquid components will redissolve in the vapors in proportion to their respective vapor pressures and molal concentrations at the particular temperature employed in accordance with the well known gas laws.

This invention makes use of this hitherto little understood factor for the control of the pressure at which efficient extraction of desirable constituents of high pressure gases may be accomplished and also to some extent for the control of the composition of the extracted constituents, for it has been found, that retrograde condensation is comparatively selective in its action upon a liquid of mixed composition, in that with initial increases in pressure within the retrograde condensation range, it appears that the lower boiling components of the liquid will be reabsorbed first, and as the pressure increases, successively higher boiling components will be reabsorbed by the gas, or conversely, as the pressure is reduced in the retrograde condensation range from higher to lower pressures, successively lower-boiling components will be condensed from the gas.

Other objects and advantages of this invention will become apparent from the following detailed description in conjunction with the accompanying drawing which diagrammatically illustrates an arrangement of apparatus suitable for practicing the process of this invention.

Referring to the drawing:

An oil well, designated A, comprises casing 1 and tubing 2 conventionally mounted therein, a pipe 3, in which is mounted a valve 4, is connected to tubing 2 and pipe 3 has connected thereto oppositely disposed branch pipes 5 and 6 equipped with valves 7 and 8, respectively. Casing 1 also has connected thereto oppositely disposed branch pipes 9 and 10, in which are mounted valves 11 and 12, respectively. Branch pipes 5 and 9 are connected to a pipe 13, equipped with a pressure control valve 13a, which leads through a series of coolers 14, 15 and 16, respectively, and from cooler 16 leads into a scrubber or separator 17. A pressure release valve 18 is mounted in pipe 13 at a point in advance of its entry into separator 17. Coolers 14, 15 and 16 are preferably conventional shell and tube type exchangers, adapted to withstand relatively high pressures and pipe 13 is connected successively to the tube sections of these coolers. Separators 17 is a high pressure vessel preferably fitted with baffles or bubble trays of conventional design, and equipped with a side draw-off pipe 19, in which is mounted a valve 20. Separator 17 is also equipped with a liquid level controller 21, which is operatively connected to valve 20. A pipe 22, equipped with a valve 23 is connected to the lower portion of separator 17 below the level of the point of exit of pipe 19 from separator 17. A pipe 24 in which is mounted a pressure control valve 25 is connected into the upper portion of separator 17 and leads therefrom into the shell of cooler 15. A pipe 26, equipped with a valve 27, leads from the shell of cooler 15, and connects with a pipe 28, equipped with a valve 29, which leads to the intake of a compressor 30. A pipe 31 leads from the discharge of compressor 30 and connects to a second oil or gas well designated B. Well B, like well A, has a conventional casing 32 and tubing 33. A pipe 34, equipped with a valve 35, connects to tubing 33 and has branch pipes 36 and 37, fitted with valves 38 and 39, respectively, and casing 32 has branch pipes 40 and 41, fitted with valves 42 and 43, respectively. Pipe 31 is connected to branch pipes 36 and 40 and a pipe 44 connects to branch pipes 37 and 41. A pipe 45, in which is mounted a valve 46, leads from a point in pipe 26 between valves 27 and 29 and connects to pipe 31, thus providing a by-pass in pipe 26 around compressor 30 to well B. A pipe 47, equipped with a valve 48, is connected to pipe 31 and leads to a connection with branch pipes 6 and 10 connected to well A. A by-pass pipe 49, equipped with a valve 50, is connected into pipe 24 at a point between separator 17 and valve 25, and leads to a connection with pipe 26 between valves 27 and 29. A pipe 51, in which is mounted a regulating valve 52, leads from a point in pipe 24 on the discharge side of valve 25 into pipe 26 at a point between cooler 15 and valve 27, thus providing a by-pass connection between pipes 24 and 26 around cooler 15. Valve 52 is operated by a connection 53 leading from a thermostatic control means 54 mounted in the upper portion of separator 17. Pipes 55 and 56, respectively, provide inlet and exit pipes to cooler 14 and pipes 57 and 58, respectively provide inlet and exit pipes to cooler 16.

The above described apparatus is used in the following manner in conducting the process of this invention:

Gas containing desirable constituents and under a high pressure such that these constituents will remain in vapor state in the gas, even though the gas is cooled below the critical temperature of such constituents, is discharged from well A through pipe 13, thence through coolers 14, 15 and 16 and into separator 17. The gas may be taken from casing 1 through branch pipe 9 and valve 11 or from tubing 2 through pipe 3, branch pipe 5 and valve 7. Valve 13a is maintained in its fully open position and valve 18 adjusted to maintain the desired high pressure, on the gas in its passage from well A to separator 17.

In its passage through coolers 14, 15 and 16, the gas is subjected to a series of cooling or heat extraction steps, whereby the temperature of the gas is progressively decreased in order that a final temperature may be reached in separator 17, at which the desirable constituents will liquefy in separator 17 when the proper pressure adjustment is made as will be more fully explained hereinafter. The first heat extraction in cooler 14 is generally accomplished by introducing water at ordinary atmospheric temperatures in the shell of cooler 14 and through pipe 55, the water, after serving its purpose, being discharged from cooler 14 through pipe 56. In cooler 15, additional heat is extracted from the gas by exchanging therewith the same gas which has been additionally cooled in cooler 16 and further cooled by expansion from the initial pressure to a lower pressure, all as will be more fully described hereinafter. The gas used for the heat extraction step in cooler 15 is introduced into the shell thereof through pipe 24 and discharged therefrom through pipe 26.

The next extraction of heat from the original gas then is accomplished in cooler 16, through the shell of which an artificial refrigerating medium, such as expanded liquid propane, ammonia or other refrigerating fluid is passed. Such fluid is introduced into the shell of cooler 16 through pipe 57 and discharged therefrom through pipe 58.

By the described heat extraction steps, sufficient heat will have been extracted from the gas in its passage through coolers 14, 15 and 16 to reduced the temperature of the gas to below the critical temperatures of the desirable constituents, and under ordinary conditions, these constituents would condense and separate from the lighter constituents of the gas. However, under the high pressure at which these heat extraction steps are conducted, the desirable constituents will be reabsorbed in the gas as rapidly as they are condensed due to the reabsorption effect at high pressures, above referred to, and no separation of desirable constituents as liquids will occur.

The cooled gas is then discharged into separator 17 through pressure relief valve 18, which releases the pressure on the gas entering separator 17 and is adjusted to reduce the pressure to that at which retrograde condensation will occur at the particular temperature to which the gas is finally cooled. The reduction of the pressure of the gas through valve 18 will produce an additional reduction in temperature of the gas in separator 17, which, together with the reduction in pressure will result in the condensation in separator 17 of substantially all the constituents, which it is desired to remove from the gas. The condensed constituents will collect in the lower portion of separator 17 and will be discharged therefrom through pipe 19 to a conventional stabilizing system, not shown. The condensed constituents will be withdrawn under control of liquid level controller 21 which will operate valve 20 in line 19 to permit discharge of condensed constituents at a rate such as to maintain a constant level thereof in separator 17. The uncondensed gas, separated from condensate in separator 17, will be discharged therefrom through pipe 24 and valve 25 thence through cooler 15 and into pipe 26. As noted, the reduction in pressure of the gas entering separator 17 will cause expansion thereof and consequently reduce the temperature of the gas below that at which it enters valve 18. This reduction in temperature is then utilized in extracting heat from the original gas passing through cooler 15 as mentioned heretofore.

The degree of pressure reduction of the gas in separator 17 is controlled by adjustment of pressure release valve 25 in pipe 24, and as noted above, the particular pressure thus maintained in separator 17 is that at which the desirable constituents will condense and at which no substantial reabsorption of the condensed constituents will occur. Under these conditions, condensation of the desirable constituents of the original gas may be accomplished while maintaining the gas at a relatively high pressure, since the pressure at which retrograde condensation occurs, when the gas has been cooled to the critical temperature of the desirable constituents is always relatively high and as a result, the residues gas will be available for disposal for any suitable purpose at relatively high pressures.

For example, residue gas discharged from cooler 15 through pipe 26, may be utilized for repressuring another oil or gas producing formation. Well B represents a well in communication with such a formation. If the formation pressure is the same or below that of the residue gas, the gas may be discharged directly from cooler 15 through pipe 26, thence through pipe 45 into and through either of branch pipes 36 and 40, thence into tubing 33 or casing 32, as may be desired, and into the formation to be repressured. In this particular case, valve 29 in pipe 28 will be closed and valve 46 in pipe 45 opened.

In case the oil or gas formation to be repressured requires a gas for this purpose at a pressure higher than that of the residue gas in pipe 26, valve 46 may be closed and valve 29 opened and the gas from pipe 26 introduced through pipe 28 to the intake of compressor 30 wherein the gas may be re-compressed to the required higher pressure and then discharged through pipe 31 into well B through either of pipes 36 and 40 as desired. Or the gas may be re-compressed by compressor 30 to a pressure sufficient to permit its use in re-pressuring the formation from which it was originally taken through well A. In this case, valves 38 and 42 are closed and valve 48 in pipe 47 opened and the re-compressed gas recycled to well A, into which it is introduced through either of branch pipes 6 or 10 by opening the corresponding valve 8 or 12.

In any case, since only a minimum amount of the initial pressure energy of the gas has been dissipated during the recovery of the desirable constituents therefrom, a maximum amount of the initial pressure energy will be available in the gas and even where re-compression is resorted to to raise the pressure of the gas, the power and equipment required for re-compression will be very much less than has heretofore been required for this purpose.

The cooling of the original gas in cooler 15 may be controlled by by-passing around cooler 15 a portion of the cool gas leaving separator 17 through pipe 24. By-pass pipe 51 and valve 52 are provided for this purpose and valve 52 is controlled by the temperature in the upper portion of separator 17 in regulating the by-passing of the gas around cooler 15. Pipe 49 and valve 50 provide an additional by-pass connection between pipe 24 and pipe 26, whereby all or any part of the gas leaving separator 17 may be diverted from its normal flow through cooler 15.

Instead of conducting the heat extraction steps of coolers 14, 15 and 16 under the initial pressure of the original gas, the pressure of the gas may first be reduced to the desired final pressure by reduction through valve 13a and control by valve 25, and the cooling may then be conducted at the reduced pressure. In this case, of course, valve 18 is not utilized as a pressure reducing valve, the control of the final pressure being subject to adjustment of valve 25. The results in the latter case will be substantially the same as in the former modification. However, when the temperature to which the gas is to be finally cooled is below a temperature at which formation of hydrates of the desirable constituents occurs, the former modification may prove more satisfactory in that the final reduction in temperature in that case will be accomplished in separator 17, and in many cases, hydrates will be formed only during this final temperature reduction step with the result that since separator 17 is of relatively large size with correspondingly large gas passages therein, the formation of hydrates will be unlikely to stop up such passages and, in addition, the hydrates will be continuously subjected to the washing action of the down-flowing condensate, which will tend to break up the hydrate crystals and wash them to the bottom of separator 17 from which they may then be withdrawn through pipe 22 and valve 23.

As one specific example of the application of the above process, gas, initially at a pressure of 2250 pounds per square inch gage, was cooled, while under this pressure, to a temperature of plus 10° F. by water cooling in cooler 14, exchange with expanded gas in cooler 15, by expansion of liquid propane in cooler 16 and by expansion through valve 18 into separator 17 from the initial pressure of 2250 pounds to a final pressure of 1600 pounds per square inch gage. The yield of liquid products in separator 17 was 2.0 gallons per 1000 cubic feet of the original gas.

In a second case, with gas initially available at 1400 pounds per square inch, approximately 84% of the original gasoline content of the gas was recovered by the above described process with a final reduction in pressure to 1000 pounds per square inch.

Generally speaking, the process described is applicable particularly to the treatment of gases under a pressure above 700 pounds per square inch gage, as it appears that below this pressure, there is no material deviation from the recognized gas laws and conventional processes may be used more or less successfully on lower pressure gases.

Since the critical temperatures of the various hydrocarbons, which are ordinarily desirable in the recovered product, such hydrocarbons being generally butanes, pentanes, and hexanes and heavier, are well above ordinary atmospheric temperatures, it is generally unnecessary to go to extremely low temperatures to recover these constituents by the described process, although at lower temperatures, the final pressure, within the retrograde condensation range, at which these products may be recovered, may be increased somewhat. The temperature range found in practice to be most generally suitable for most field conditions is from about −5° F. to 40° F., although higher or lower temperatures may be used depending upon the composition of the original gas and upon the particular components or mixture of components which it is desired to recover, and upon the temperature and pressure conditions which are found most economical to apply.

Another important advantage arising from this invention is that the composition of the recovered constituents may be controlled, in some degree, by control of the pressure in the range in which retrograde condensation of the desired constituents occurs. As noted above, retrograde condensation is apparently selective, for it appears that at any particular temperature, when the pressure is initially increased in the retrograde condensation range, the lightest constituents of the recovered products will first be reabsorbed in the high pressure gas and as the pressure is increased, successively heavier constituents will be reabsorbed. Conversely, as noted above, at a particular temperature, as the pressure is reduced within the retrograde condensation range, successively lighter components will condense. For example, in a gas at the high pressure of the order above noted, and containing in vapor state propane, butanes, pentanes and heavier, as the pressure is reduced from its upper limits in the retrodgrade condensation range, largely pentanes and heavier will first condense, and as the pressure is further reduced, butanes and then propane will condense in succession. Thus by selecting a particular pressure within the retrograde condensation range, a liquid condensate of at least partially controlled composition may be recovered. In this way, while conducting the foregoing process under high pressures, the recovered product may be at least partially stabilized by proper regulation of the condensation pressure, and thereby effect a material saving in the cost of stabilizing and fractionating the recovered product.

Various changes and modifications may be made in the process steps heretofore set forth without departing from the scope of the appended claims.

For example, instead of cooling the gas by three different cooling mediums as described above, only one or two of these mediums may be used. In some cases, expansion of the gas from the initial pressure to the final pressure may produce sufficient cooling to condense the desired constituents. Or propane or other artificial refrigerants alone may be used. Again, only water cooling may be sufficient. Since high pressure gases coming from oil or gas wells are initially at temperatures substantially above normal atmospheric temperatures, the initial cooling of the gas to atmospheric temperature is generally best accomplished by means of water cooling because of the relative cheapness of this medium. Any additional cooling required may then be supplied by either one or both of the other mediums referred to.

What I claim and desire to secure by Letters Patent is:

1. The method of recovering desirable liquefiable constituents from natural gas which is initially at a high pressure within the retrograde condensation range of said constituents which comprises, cooling said gas sufficiently to condense said constituents while reducing said high pressure substantially only within the retrograde condensation range of said constituents at the reduced temperature, and separating the resulting condensed constituents from uncondensed gas.

2. The method of recovering desirable liquefiable constituents from natural gas which is initially at a high pressure within the retrograde condensation range of said constituents which comprises, cooling said gas sufficiently to condense said constituents while the gas is maintained under said high pressure, thereafter reducing said high pressure substantially only within the retrograde condensation range of said constituents at the reduced temperature, and separating the resulting condensed constituents from uncondensed gas.

3. The method of recovering desirable liquefiable constituents from natural gas which is initially at a high pressure within the retrograde condensation range of said constituents which comprises, pre-cooling said gas while under said high pressure to a temperature below its initial temperature but above the final desired temperature for condensation of said constituents, then reducing said high pressure substantially only within the retrograde condensation range of said constituents at said final temperature and thereby to further cool said gas to said final temperature, and separating the resulting condensed constituents from uncondensed gas.

4. The method of recovering desirable liquefiable constituents from natural gas which is initially at a high pressure within the retrograde condensation range of said constituents which comprises, cooling said gas below its initial temperature while said gas is maintained under said high pressure, thereafter reducing said high pressure sufficiently only to produce retrograde condensation of said constituents at the reduced temperature, separating the resulting condensed constituents from uncondensed gas, and utilizing the refrigeration effect produced in the gas by the reduction in pressure to accomplish the aforesaid cooling.

5. The method of recovering desirable liquefiable constituents from natural gas which is initially at a high pressure within the retrograde condensation range of said constituents which comprises, cooling said gas below its initial temperature while said gas is maintained under said high pressure, thereafter reducing said high pressure sufficiently only to produce retrograde condensation of said constituents at said reduced temperature, separating the resulting condensed constituents from uncondensed gas, and accomplishing the aforesaid cooling in part by the refrigeration effect produced in said gas by the reduction in pressure thereof and in part by artificial refrigeration.

6. The method of recovering desirable liquefiable constituents from natural gas which is initially at a pressure above 700 pounds per square inch which comprises, cooling said gas to a suitable condensation temperature for said constituents, reducing the initial pressure of the gas substantially only within the retrograde condensation range of said constituents at said condensation temperature but not below 700 pounds per square inch, and separating the resulting condensed constituents from uncondensed gas.

7. The method of recovering desirable liquefiable constituents from natural gas which is initially at a pressure above 700 pounds per square inch which comprises, cooling said gas while under said pressure to a temperature below its initial temperature but above the final desired temperature, then reducing said initial pressure substantially only within the retrograde condensation range of said constituents and to thereby further cool said gas to said final temperature, and separating the resulting condensed constituents from uncondensed gas.

8. The method of recovering desirable liquefiable constituents from gas which is initially at a pressure above 700 pounds per square inch which comprises, subjecting said gas to multi-stage cooling to condense said constituents while reducing the initial pressure of said gas substantially only within the retrograde condensation range of the desired constituents at the final temperature, separating condensed constituents from uncondensed gas, and cooling the gas in at least one of the cooling stages by the refrigeration effect produced by the reduction in pressure of the gas.

9. The method of recovering gasoline constituents from natural gas which is initially at a pressure above 700 pounds per square inch which comprises, subjecting said gas to multi-stage cooling to condense said constituents while reducing the initial pressure of the gas substantially only within the retrograde condensation range of the desired constituents at the final temperature but not below 700 pounds per square inch, separating condensed constituents from uncondensed gas, and cooling the gas in at least one of the cooling stages by the refrigeration effect produced by the reduction in pressure of the gas.

10. The method of recovering desirable liquefiable constituents from gas which is initially at a high pressure within the retrograde condensation range of said constituents which comprises, cooling said gas in a series of cooling stages of progressively decreasing temperature to a final temperature suitable to condense said constituents, reducing said pressure only in the final one of said cooling stages and sufficiently only to produce retrograde condensation of said constituents and to cool said gas by the expansion thereof to said final temperature, separating condensed constituents from uncondensed gas in said final cooling stage, and utilizing said uncondensed gas as a cooling medium in an earlier one of said cooling stages.

11. The method of recovering desirable liquefiable constituents from natural gas which is initially at a high pressure within the retrograde condensation range of said constituents which comprises, cooling said gas in a series of cooling stages of progressively decreasing temperature to a final temperature suitable to condense said constituents, reducing said pressure only in the final one of said cooling stages sufficiently only to produce retrograde condensation of said constituents and to cool said gas by the expansion thereof to said final temperature, separating condensed constituents from uncondensed gas in said final cooling stage, utilizing said uncondensed gas as a cooling medium in an earlier one of said cooling stages, and utilizing an artificial refrigerating medium in an intermediate one of said cooling stages.

12. The method of recovering desirable liquefiable constituents from gas which is initially at a high pressure within the retrograde condensation range of said constituents which comprises, reducing the initial pressure of the gas substantially only within the retrograde condensation range of said constituents, thereafter cooling said gas to condense said constituents, and separating the resulting condensed constituents from uncondensed gas.

13. The method of recovering desirable liquefiable constituents from gas which is initially at a pressure above 700 pounds per square inch which comprises, reducing the initial pressure of the gas substantially only within the retrograde condensation range of said constituents but not below 700 pounds per square inch, thereafter cooling said gas to condense said constituents, and separating the resulting condensed constituents from uncondensed gas.

14. The method of recovering desirable liquefiable constituents from natural gas which is initially at a high pressure within the retrograde condensation range of said constituents which comprises, cooling said gas sufficiently to condense said constituents while the gas is maintained under said high pressure, thereafter reducing said high pressure substantially only within the retrograde condensation range of said constituents at the reduced temperature, separating the resulting condensed constituents from uncondensed gas, and passing said uncondensed gas into indirect heat-exchange relationship with said natural gas prior to the reduction in pressure thereof.

WILLIAM H. VAUGHAN.

DISCLAIMER 2,133,774.—*William H. Vaughan*, Rodessa, La. HIGH PRESSURE GAS PROCESS. Patent dated October 18, 1938. Disclaimer filed February 17, 1941, by the assignees, *Tide Water Associated Oil Company* and *Seaboard Oil Company of Delaware*.

Hereby enter this disclaimer to claims 1, 2, 3, 4, 6, 7, 8, 9, 10, 12, 13, and 14.
[*Official Gazette March 18, 1941*.]